US008224648B2

(12) United States Patent
Tian et al.

(10) Patent No.: US 8,224,648 B2

(45) Date of Patent: Jul. 17, 2012

(54) HYBRID APPROACH IN VOICE CONVERSION

(75) Inventors: Jilei Tian, Tampere (FI); Victor Popa, Tampere (FI); Jani Kristian Nurminen, Lempäälä (FI)

(73) Assignee: Nokia Corporation, Espoo (FI)

( * ) Notice: Subject to any disclaimer, the term of this patent is extended or adjusted under 35 U.S.C. 154(b) by 1235 days.

(21) Appl. No.: 11/966,255

(22) Filed: Dec. 28, 2007

(65) Prior Publication Data

US 2009/0171657 A1 Jul. 2, 2009

(51) Int. Cl.
*G01L 13/06* (2006.01)

(52) U.S. Cl. ......... 704/268; 704/258; 704/269; 704/219

(58) Field of Classification Search .................. 704/219, 704/258, 268, 269

See application file for complete search history.

(56) References Cited

U.S. PATENT DOCUMENTS

| | | | | |
|---|---|---|---|---|
| 7,580,839 | B2 * | 8/2009 | Tamura et al. | 704/258 |
| 7,765,101 | B2 * | 7/2010 | En-Najjary et al. | 704/246 |
| 2004/0024601 | A1 | 2/2004 | Gopinath et al. | |
| 2007/0185715 | A1 * | 8/2007 | Wei et al. | 704/254 |

OTHER PUBLICATIONS

Toda, T. et al. "Voice Conversion Algorithm Based on Gaussian Mixture Model with Dynamic Frequency Warping of Straight Spectrum." IEEE, 2001.*

V. Wan et al., "Evaluation of Kernel Method for Speaker Verification and Identification," Acoustics, Speech and Signal Processing, 2002. Proceedings. (ICASSP '02). IEEE International Conference on I-669-I672 vol. 1, pp. 669, line 10-line 11, sections 4.3 & 5.2.

Sheng LV et al., "Voice Conversions Algorithm Using Phoneme Gaussian Mixture Model," Intelligent Multimedia, Video and Speech Processing, 2004. Proceedings of 2004 International Symposium on, pp. 5-8, Oct. 20-22, 2004, sections 1 & 2.2.

Yu Yi-Kuo et al, "Statistical Significance of Probabilistic Sequence Alignment and Related Local Hidden Markov Models", Journal of Computational Biology. 2001, vol. 8, No. 3, pp. 249-282. doi:10.1089/10665270152530845. Retrieved from: matisse.ucsd.edu/~hwa/pub/hybrid.pdf, appendix D.

P.A. Olsen et al., "Modeling Inverse Covariance Matrices by Basis Expansion", Speech and Audio Processing, IEEE Transactions on, vol. 12, No. 1, pp. 37-46, Jan. 2004, section II—preface.

Yining Chen et al., "Voice Conversion with Smoothed GMM and MAP Adaptation," in Proc. of EUROSPEECH 2003—Geneva, pp. 2413-2416.

Steve Young et al., "HTK Book," Printed from http://htk.eng.cam.ac.uk/download.shtml on Jun. 24, 2006, 354 pages.

Yun et al., "A Distributed Memory MIMD Multi-computer with Reconfigurable Custom Computing Capabilities," 1997.

Zuo et al., "Improving the Performance of MGM-Based voice conversion by Preparing Training Data Method," 2004.

(Continued)

*Primary Examiner* — Talivaldis Ivars Smith
*Assistant Examiner* — Shaun Roberts
(74) *Attorney, Agent, or Firm* — Banner & Witcoff Ltd.

(57) ABSTRACT

A hybrid approach is described for combining frequency warping and Gaussian Mixture Modeling (GMM) to achieve better speaker identity and speech quality. To train the voice conversion GMM model, line spectral frequency and other features are extracted from a set of source sounds to generate a source feature vector and from a set of target sounds to generate a target feature vector. The GMM model is estimated based on the aligned source feature vector and the target feature vector. A mixture specific warping function is generated each set of mixture mean pairs of the GMM model, and a warping function is generated based on a weighting of each of the mixture specific warping functions. The warping function can be used to convert sounds received from a source speaker to approximate speech of a target speaker.

42 Claims, 7 Drawing Sheets

OTHER PUBLICATIONS

Alexander Kain et al., "Spectral Voice Conversion for Text-to-Speech Synthesis", Center for Spoken Language Understanding, Oregon Graduate Institute of Science and Technology. 4 pages.
Zhiwei Shuang et al., "Voice conversion Based on Mapping Formants", TC-STAR Workshop on Speech-to-Speech Translation, Jun. 19-21, 2006, Barcelona, Spain, 5 pages.
Li Lee et al., "A Frequency Warping Approach to Speaker Normalization", IEEE Transactions on Speech and Audio Processing, vol. 6, No. 1, Jan. 1998, pp. 49-60.
Daniel Erro et al., "Weighted Frequency Warping for Voice Conversion", INTERSPEECH 2007, 4 pages.

* cited by examiner

300

HYBRID APPROACH IN VOICE CONVERSION

The technology generally relates to devices and methods for conversion of speech in a first (or source) voice so as to resemble speech in a second (or target) voice.

BACKGROUND

Voice conversion systems may be used in a wide variety of applications. In general, "voice conversion" refers to techniques for modifying the voice of a first (or source) speaker to sound as though it were the voice of a second (or target) speaker. As such, voice conversion transforms speech signals to change the perceived identity of the speaker while preserving the speech content. Such transformations typically use conversion models trained on speech provided by source and target speakers.

Gaussian Mixture Modeling (GMM), codebook and frequency warping methods are commonly used for voice conversion. For instance, frequency warping is a voice conversion technique that provides high quality converted speech, but has limited ability to provide speaker identity conversion. Conversely, GMM is a technique which offers good speaker identity conversion but may significantly degrade the quality of the converted speech.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In some embodiments, target and source speakers provide voice input that is divided into segments. Parameters of the segments may be calculated and included in a source feature vector and a target feature vector. The source feature vector and the target feature vector can be joined and aligned to form a joint random variable, and a mixture model, such as a voice conversion model, can be trained using the joint random variable. A mean vector of the joint random variable can be split into source and target parts and used to generate source and target spectral envelopes. A constrained search can automatically find formant alignment for each pair of spectral envelopes. Then, mixture specific warping functions of each mixture can be derived by curve fitting through the aligned formants. The warping function applicable to a given source segment in the voice conversion process may be a weighted combination of all mixture specific warping functions. Prior probabilities may be used as the weights in the combination. Finally the warping function can be directly applied on speech parameters (e.g., on compressed speech parameters) to convert speech of the source speaker to approximate speech of the target speaker.

BRIEF DESCRIPTION OF THE DRAWINGS

The foregoing summary of the invention, as well as the following detailed description of illustrative embodiments, may be better understood when read in conjunction with the accompanying drawings, which are included by way of example, and not by way of limitation with regard to the claimed invention.

DETAILED DESCRIPTION

Systems and methods in accordance with exemplary embodiments provide a hybrid approach that combines certain aspects of frequency mapping and voice conversion Gaussian mixture models (GMM) to provide both high quality speech and good identity mapping in converted speech. The exemplary embodiments discussed herein present a hybrid voice conversion approach by applying frequency warping to parameterized speech, i.e., for the modification of speaker identity related features of speech signals. Thus, the hybrid voice conversion approach can directly apply to compressed or uncompressed speech. In this framework, a speech signal can be represented using the Very Low Bit Rate (VLBR) codec proposed by NOKIA Corporation in U.S. published patent application no. 2005/0091041, entitled "Method and System for Speech Coding," the contents of which are incorporated herein by reference. The VLBR codec serves only as an example for a codec that allows for an encoding of a source speech signal under consideration of a segmentation of a source speech signal, wherein said segmentation depends on characteristics of said source speech signal. Initially, the GMM may be trained on a set of equivalent utterances provided by a source and target speaker. Once trained, the trained GMM may be used to convert sounds from a source speaker to resemble speech of a target speaker.

Except with regard to element 120 in FIG. 1 (discussed below), "speaker" is used herein to refer to a human uttering speech (or a recording thereof) or to a text-to-speech (TTS) system (e.g., a High Quality (HQ)-TTS system). "Speech" refers to verbal communication. Speech is typically (though not exclusively) words, sentences, etc. in a human language.

Figure 1:
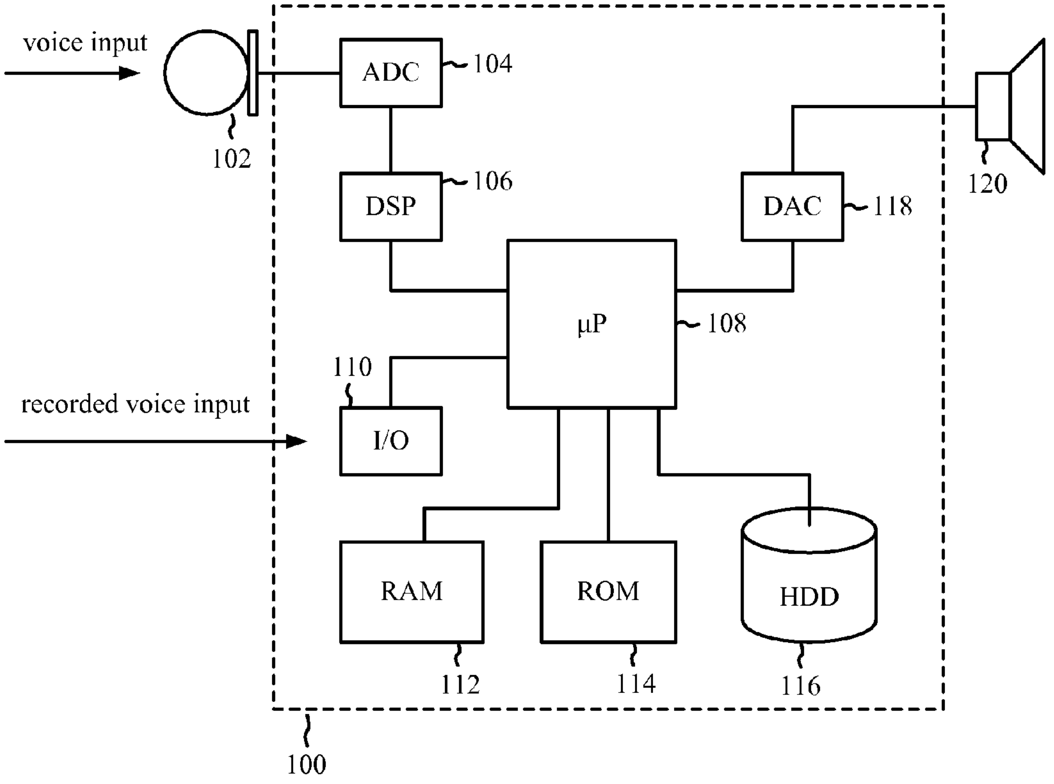
FIG. 1 is a block diagram of a voice conversion device configured to perform voice conversion according to at least some exemplary embodiments.

FIG. 1 is a block diagram of a voice conversion device 100 configured to perform voice conversion according to at least some exemplary embodiments. A microphone 102 receives voice input from a source speaker and/or a target speaker and outputs a voice signal to an analog-to-digital converter (ADC) 104. The voice conversion device 100 is also configured to receive voice input of the source and/or target speaker through an input/output (I/O) port 110. In some cases, the voice input may be a recording in a digitized or analog form stored in random access memory (RAM) 112 and/or magnetic disk drive (HDD) 116.

For a voice signal received from the microphone 102 and for recordings of a voice signal in an analog form, the ADC

104 digitizes the voice signal and outputs a digitized voice signal to a digital signal processor (DSP) 106. For recordings of a voice signal in a digital form, the RAM 112 and/or HDD 116 may output the digitized voice signal to the DSP 106.

The DSP 106 divides the digitized voice signal into segments and generates parameters to model each segment. The parameters may be measurements of various attributes of sound and/or speech. In accordance with at least some exemplary embodiments, the DSP 106 may apply linear prediction to model each segment. The linear prediction model may be, for example, represented as a line spectral frequency representation of the segment. For more detail, refer to U.S. published patent application no. 2005/0091041. During linear prediction-based speech modeling, the DSP 106 may calculate the parameters to identify various features of each segment, and may create a feature vector containing the parameters for each segment. Specifics of the feature vector will be discussed in further detail below. The DSP 106 may output the feature vector to a microprocessor (μP) 108. The operations performed by DSP 106 could also be performed by microprocessor 108 or by another microprocessor (e.g., a general purpose microprocessor) local and/or remote to the voice conversion device 100.

In accordance with at least some exemplary embodiments, the microprocessor 108 has two modes of operation. In a first mode, the microprocessor 108 may analyze the feature vector of the source speaker ("source feature vector") and a feature vector of a target speaker ("target feature vector") for training a warping function of a voice conversion GMM model that may be later used for voice conversion. In a second mode, the microprocessor 108 may receive a digitized voice input provided by a source speaker, may generate a source feature vector based on the digitized voice input, and may apply the warping function derived in the first mode to the source feature vector for voice conversion to cause the digitized voice input to resemble speech of the target speaker. Alternatively, different devices may be used for training and conversion.

In accordance with at least some exemplary embodiments, in the second mode, after the microprocessor 108 converts the digitized voice input, a digitized version of the converted voice input is processed by a digital-to-analog converter (DAC) 118 and output through speaker 120. Instead of (or prior to) output of the converted voice via DAC 118 and speaker 120, the microprocessor 108 may store the digitized version of the converted voice in the random access memory (RAM) 112 and/or the magnetic disk drive (HDD) 116. In some cases, microprocessor 108 may output a converted voice (through I/O port 110) for transfer to another device attached thereto or via a network. Additionally, the DAC 118 may output an analog version of the converted voice input for storage in the random access memory (RAM) 112 and/or the magnetic disk drive (HDD) 116.

In some embodiments, the microprocessor 108 performs voice conversion and other operations based on programming instructions stored in the RAM 112, the HDD 116, the read-only memory (ROM) 114 or elsewhere. Preparing such programming instructions is within the routine ability of persons skilled in the art once such persons are provided with the information contained herein. In yet other embodiments, some or all of the operations performed by microprocessor 108 are hardwired into microprocessor 108 and/or other integrated circuits. In other words, some or all aspects of voice conversion operations can be performed by an application specific integrated circuit (ASIC) having gates and other logic dedicated to the calculations and other operations described herein. The design of an ASIC to include such gates and other logic is similarly within the routine ability of a person skilled in the art if such person is first provided with the information contained herein. In yet other embodiments, some operations are based on execution of stored program instructions and other operations are based on hardwired logic. Various processing and/or storage operations can be performed in a single integrated circuit or divided among multiple integrated circuits ("chips" or a "chip set") in numerous ways.

The voice conversion device 100 can take many forms, including a standalone voice conversion device, components of a desktop computer (e.g., a PC), a mobile communication device (e.g., a cellular telephone, a mobile telephone having wireless internet connectivity, or another type of wireless mobile terminal), a personal digital assistant (PDA), a notebook computer, a video game console, etc. In certain embodiments, some of the elements and features described in connection with FIG. 1 are omitted. For example, a device which only generates a converted voice based on text input may lack a microphone and/or DSP. In still other embodiments, elements and functions described for the voice conversion device 100 can be spread across multiple devices remote or local to one another (e.g., partial voice conversion is performed by one device and additional conversion by other devices, a voice is converted and compressed for transmission to another device for recording or playback, etc.).

For instance, voice conversion in accordance with exemplary embodiments can be utilized to extend the language portfolio of high-quality text-to-speech (HQ-TTS) systems for branded voices in a cost efficient manner. In this context, voice conversion can be used to permit a company to produce a synthetic voice from a voice talent in languages that the voice talent cannot speak. In addition, voice conversion can be used in entertainment applications and games, voice conversion technology, such as reading text messages with the voice of the sender. Voice conversion in accordance with exemplary embodiments also may be used in other applications.

As discussed above, before a frequency warping function is applied to a source feature vector for voice conversion, the microprocessor 108 may train a voice conversion GMM model on a set of source and target feature vectors to train the frequency warping function so that voice input from the source speaker may approximate speech of the target speaker. The following describes training of a warping function in accordance with exemplary embodiments.

Figure 2A:
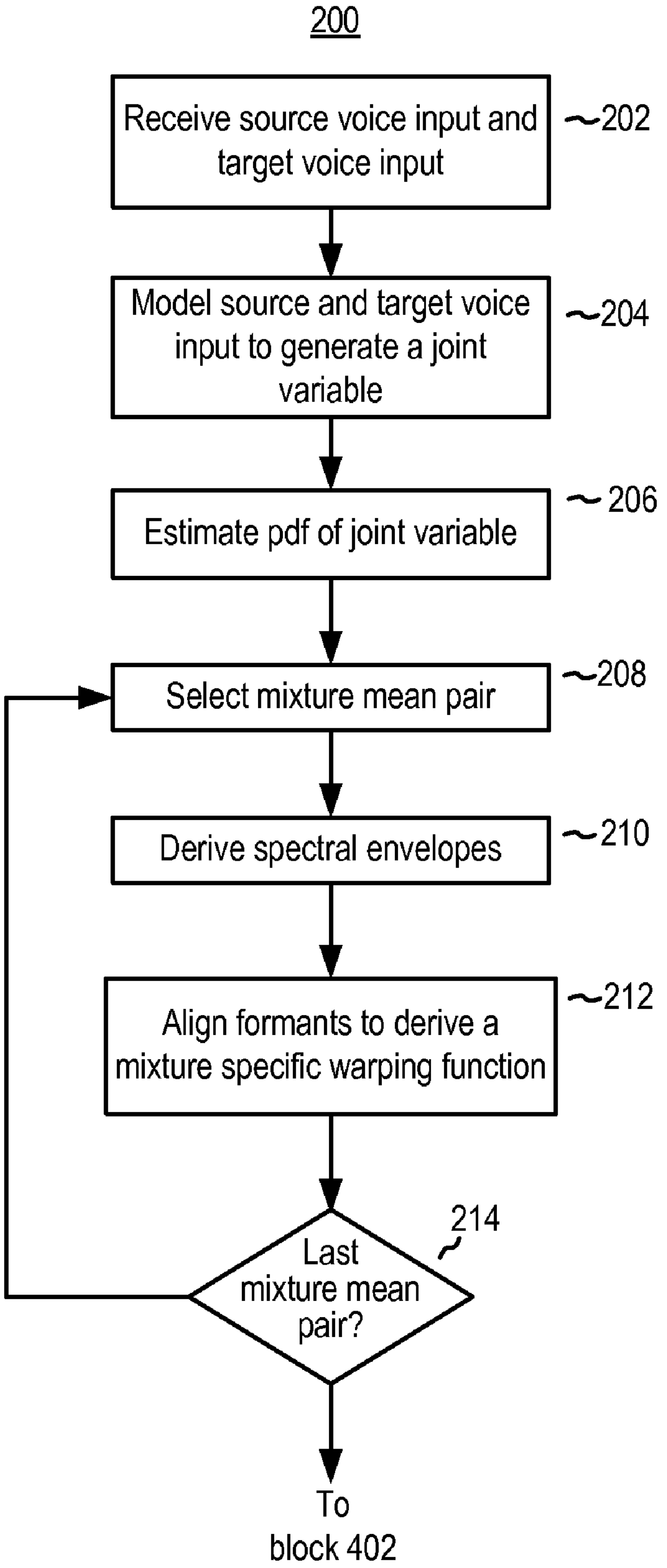
FIG. 2A illustrates a flow diagram of a method for training a voice conversion GMM model on a set of aligned source and target feature vectors in accordance at least some exemplary embodiments.

FIG. 2A illustrates a flow diagram of a method for training a voice conversion GMM model on a set of aligned source and target feature vectors in accordance with at least some exemplary embodiments. The method 200 may begin at block 202.

In block 202, the method 200 may include receiving a set of digitized source and target voice inputs of equivalent acoustic events. In accordance with exemplary embodiments, the ADC 104 may be configured to receive source and target voice signals of equivalent acoustic events. An equivalent acoustic event may refer to both the source and target speaker uttering the same sound, word, and/or phrase. In one embodiment, a source speaker may speak a set of one or more equivalent acoustic events into the microphone 102, and the ADC 104 may digitize and forward a signal of the acoustic events to the DSP 106. Additionally, the target speaker may speak the same set of one or more equivalent acoustic events into the microphone 102, and the ADC 104 may digitize and forward a signal of the acoustic events to the DSP 106. In another embodiment, digitized versions of the equivalent acoustic events from one or both of the source speaker and the target speaker may be retrieved from the RAM 112 and/or HDD 116, and forwarded to the DSP 106. In a further embodiment, analog versions of the equivalent acoustic events of one or both of the source speaker and the target speaker may be retrieved from the RAM 112 and/or HDD 116, digitized by the ADC 104, and forwarded to the DSP 106.

In block 204, the method 200 may include modeling the segments of the equivalent acoustic events of the digitized source and target voice input to generate a joint variable. Each of the segments may include two types of signals: a vocal tract contribution and an excitation signal, including line spectral frequency (LSF), pitch, voicing, energy, and spectral amplitude of excitation. The vocal tract contribution is the audible portion of the source and/or target speaker's voice captured in the digitized segment that is capable of being predicted, and hence modeled. The excitation signal may represent the residual signal in the digitized segment.

The vocal tract contribution of the digitized voice signal can be modeled in many different ways. A reasonably accurate approximation, from the perceptual point of view, can be obtained using linearly evolving voiced phases and random unvoiced phases. In accordance with at least some exemplary embodiments, the vocal tract contribution can be modeled using a linear prediction model. The excitation signal can be modeled using a sinusoidal model. Modeling of the vocal tract contribution and the excitation signal is briefly discussed below with reference to FIG. 2B. For more detail, refer to U.S. published patent application no. 2005/0091041.

Figure 2B:
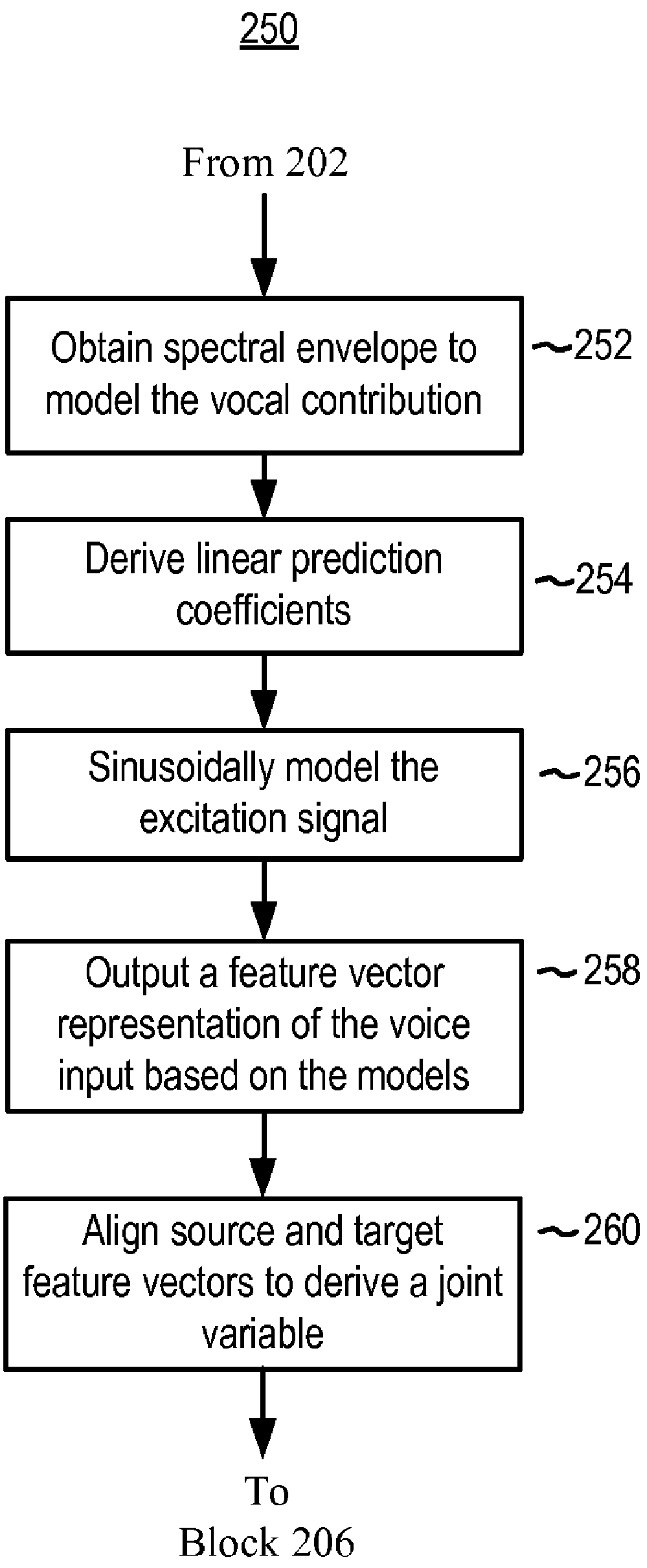
FIG. 2B illustrates a flow diagram of a method for modeling of the vocal tract contribution and the excitation signal in accordance at least some exemplary embodiments.

FIG. 2B illustrates a flow diagram of a method for modeling of the vocal tract contribution and the excitation signal in accordance at least some exemplary embodiments. The method 250 may begin at block 252.

In block 252, the method 250 may include obtaining a spectral envelope to model the vocal tract contribution. In accordance with exemplary embodiments, the DSP 106 may obtain a spectral envelope of the vocal tract contribution of the segment to model the vocal tract contribution using linear prediction, such as, but not limited to, a line spectral frequency (LSF) representation. Using the well-known linear prediction approach, the DSP 106 may use previous speech samples to form a prediction for a new sample.

In block 254, the method 250 may include deriving linear prediction coefficients for the LSF representation based on the spectral envelope. The linear prediction coefficients $\{a_j\}$ model the vocal tract contribution of the digitized voice signal reasonably well. In accordance with at least some exemplary embodiments, the DSP 106 can estimate the linear prediction coefficients $\{a_j\}$ using an autocorrelation method or a covariance method, with the autocorrelation method being preferred due to the ensured filter stability.

Following the well-known source-filter modeling, the remaining residual r(t) can be regarded as the excitation signal, which is modeled in a frame-wise manner as a sum of sinusoids, $$r(n) = \sum_{m=1}^{M} A_m \cos(n\omega_m + \theta_m), \quad (1)$$

where $A_m$ and $\theta_m$ represent the amplitude and the phase of each sine-wave component associated with the frequency track $\omega_m$, M denotes the total number of sine-wave components, and n denotes the index of the speech sample.

In block 256, the method 250 may include sinusoidally modeling the excitation signal. The DSP 106 may model the excitation signal using a sinusoidal model. In this example, the DSP 106 models the unvoiced portion using sinusoids as follows:

$$r(n) = \sum_{m=1}^{M} A_m (v_m \cos(n\omega_m + \theta_m^V) + (1 - v_m)\cos(n\omega_m + \theta_m^U)), \quad (2)$$

where $V_m$ is the degree of voicing for the $m^{th}$ sinusoidal component ranging from 0 to 1, while $\theta_m^V$ and $\theta_m^U$ denote the phase of the $m^{th}$ voiced and unvoiced sine-wave component, respectively.

One alternative to the above approach is to model the voiced contribution using the sinusoidal model from Eq. (1) above and to separately model the unvoiced contribution as spectrally shaped noise.

In block 258, the method 250 may include outputting a feature vector representation of the voice input based on the models of the vocal tract contribution and the excitation signal. In accordance with at least some exemplary embodiments, the output of the DSP 106 can be computed as $$r(t) = s(t) - \sum_{j=1}^{K} a_j s(t - j), \quad (3)$$

where s(t) denotes the discrete speech signal value at time t, K is the order of LPC modeling, $a_j$ are the linear prediction coefficients, and r(t) denotes the residual signal that cannot be predicted.

In one embodiment, the DSP 106 outputs a representation of the speech from each of the target and source speakers as feature vectors that include a set of five parameters. Each of these parameters is estimated at equal intervals from the input speech signal: (1) LSFs (lsf), vocal tract contribution modeled using linear prediction; (2) Energy (e) to measure overall gain; (3) Amplitude (a) of the sinusoids of excitation spectrum; (4) Pitch (p); and (5) Voicing information (v). The feature vector includes each of these parameters for each segment. As such, the DSP 106 may generate a source feature vector x based on the set of n segments provided by the source speaker and a target feature vector y based on the set of n segments of equivalent events provided by the target speaker.

In block 260, the method 250 may include aligning the parameters of the source feature vector x with the parameters of the equivalent acoustic events in the target feature vector y to derive a joint variable v. In accordance with at least some exemplary embodiments, the DSP 106 may align the equivalent acoustic events from the source speaker and from the target speaker. The commonly used dynamic time warping (DTW) algorithm may be used for aligning the source feature vector x with the target feature vector y. Other alignment algorithms also may be used. For example, the DSP 106 may align a first segment of a first digitized signal of where the source speaker speaks a sound, word, and/or phrase and a second segment where the target speaker speaks the same sound, word, and/or phrase. Alignment may provide a reasonable mapping between the segments to represent corresponding equivalent acoustic events.

Once the feature vectors x and y have been aligned, the DSP 106 may create a joint variable $v=[x^T\ y^T]^T$. The joint variable v is a vector that includes the feature vector x that includes the parameters of the source speaker and the feature vector y that includes the parameters of the target speaker, and the variable T represents the transpose of these vectors. For example, parameter pair $[x_i\ y_i]$ in the feature vector v corresponds to the $i^{th}$ segment in the source feature vector x and in the target feature vector y, which includes the parameters where the source and target speaker provide equivalent acoustic events (e.g., each say the same sound, word, and/or phrase). The DSP 106 may then output the joint variable v. The joint variable v may be used for training of a mixture module, which is a voice conversion algorithm applied by the microprocessor 108, to permit the microprocessor 108 to map the source feature vector x to the target feature vector y. The method 250 may return to block 206 in FIG. 2A.

In block 206, the method 200 may include estimating a probability density function (pdf) of the joint variable v. In accordance with at least some exemplary embodiments, the microprocessor 108 may estimate a pdf of the joint random variable v using an expectation maximization (EM) algorithm from a sequence of v samples $[v_1\ v_2 \ldots v_t \ldots v_p]$, provided that the dataset is long enough. The EM algorithm is described in the article "Maximum likelihood from incomplete data via the EM algorithm" to Dempster et al published in the Journal of the Royal Statistical Society, Series B, 39(1):1-38, 1977. The EM algorithm may be used for finding maximum likelihood estimates of parameters in probabilistic models, where the model depends on unobserved latent variables. The EM algorithm alternates between an expectation computation and a maximization computation. During the expectation computation, the EM algorithm computes an expectation of the maximum likelihood estimates by including the unobserved latent variables as if the latent variables were observed. During the maximization computation, the EM algorithm computes the maximum likelihood estimates of the parameters by maximizing the expected likelihood found in the expectation computation. The parameters found in the maximization computation are then used to begin another expectation computation, and the EM algorithm is repeated.

In accordance with at least some exemplary embodiments, the joint variable v may be a GMM distributed random variable. In the particular case when $v=[x^T y^T]^T$ is a joint variable, the distribution of v can be used for probabilistic mapping between the two variables. For instance, the distribution of v may be modeled by GMM as in Equation (4).

$$P(v) = P(x, y) = \sum_{l=1}^{L} c_l \cdot N(v, \mu_l, \Sigma_l), \tag{4}$$

where $c_l$ is the prior probability of v for the component $$\left(\sum_{l=1}^{L} c_l = 1 \text{ and } c_1 \geq 0\right),$$

L denotes the number of mixtures and $N(v, \mu_l, \Sigma_l)$ denotes Gaussian distribution with the mean vector $\mu_l$ and the covariance matrix $\Sigma_l$.

The parameters of the GMM can be estimated using the well-known Expectation Maximization (EM) algorithm.

For the actual transformation, a function F(.) is desired such that the transformed $F(x_t)$ best matches the target $y_t$ for all data in the training set. One conversion function that converts source feature $x_t$ to target feature $y_t$ is given by Equation (5).

$$F(x_t) = E(y_t \mid x_t) = \sum_{l=1}^{L} p_l(x_t) \cdot (\mu_l^y + \Sigma_l^{yx}(\Sigma_l^{xx})^{-1}(x_t - \mu_l^x)) \tag{5}$$

$$p_l(x_t) = \frac{\hat{c}_l \cdot N(x_t, \mu_l^x, \Sigma_l^{xx})}{\sum_{i=1}^{L} c_i \cdot N(x_t, \mu_i^x, \Sigma_i^{xx})}$$

The weighting terms p are chosen to be the conditional probabilities that the feature vector $x_t$ belongs to the different components. The microprocessor 108 may use the pdf of the GMM random variable v to generate a mixture specific warping function $W_l(\omega)$ for a given mixture mean pair.

In block 208, the method 200 may include selecting a mixture mean pair $[\mu_l^x \mu_l^y]$ associated with a particular segment. In accordance with at least some exemplary embodiments, the microprocessor 108 selects a segment l and its associated mixture mean pair $[\mu_l^x\ \mu_l^y]$ from mean vector g provided in equation (4) above.

In block 210, the method 200 may include deriving spectral envelopes for each of the source and target means from the selected mean mixture pair $[\mu_l^x\ \mu_l^y]$. In accordance with at least some exemplary embodiments, for the $l^{th}$ mixture mean pair, the microprocessor 108 can derive source and target spectral envelopes for each of the source and target means $\mu_l^x$ and $\mu_l^y$.

In block 212, the method 200 may include aligning formants of the spectral envelopes from the selected mean mixture pair to establish the mixture specific warping function. In accordance with at least some exemplary embodiments, the microprocessor 108 aligns the formants of the paired spectral envelopes to establish the mixture specific warping function $W_l(\omega)$, which will be later described below with reference to FIG. 3.

In block 214, the method 200 may include determining whether a mixture specific warping function and a mixture weight has been created for all of the mixture mean pairs. If not, the method 200 may return to block 208 to process a next mean mixture pair. If so, the method 200 may continue to block 402 in FIG. 4.

Once the microprocessor 108 calculates the mixture specific warping functions, the microprocessor 108 may use a weighted combination of the mixture specific warping functions in the second mode to convert additional sounds received from the source speaker to resemble speech of the target speaker without having to receive any additional sounds, words, and/or phrases from the target speaker. Before describing voice conversion, calculation of the mixture specific warping function for a particular mixture mean pair is further described below with reference to FIG. 3.

Figure 3:
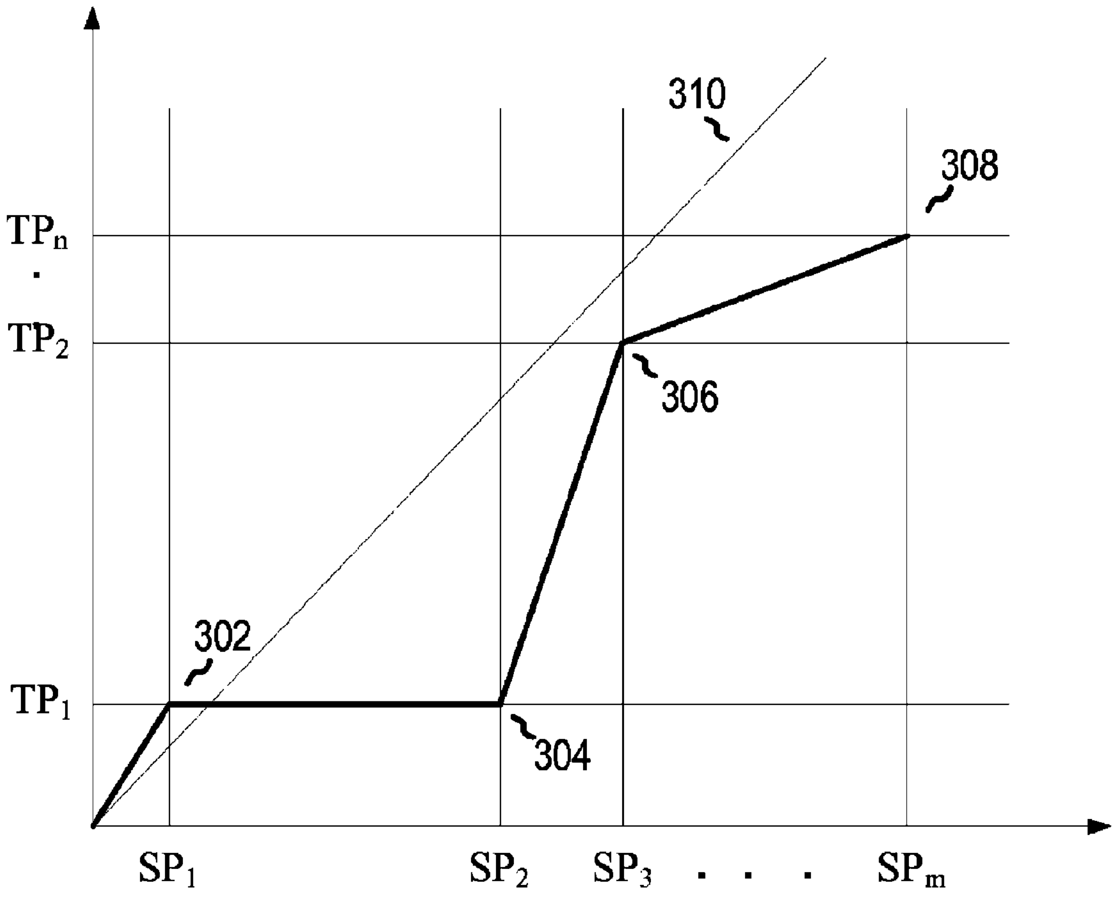
FIG. 3 illustrates a lattice for deriving a mixture specific warping function in accordance with at least some exemplary embodiments.

FIG. 3 illustrates a lattice for deriving a mixture specific warping function in accordance with exemplary embodiments. The microprocessor 108 may generate a lattice 300 to automatically derive the mixture specific warping function. In accordance with at least some exemplary embodiments, the microprocessor 108 generates the lattice 300 (which also may be referred to as a "grid") from spectral envelopes obtained from aligned LPC vectors calculated directly from LSF vectors of the source and target speakers for a particular mixture mean pair.

In this example, the microprocessor 108 identifies spectral peaks denoted as $SP_1, SP_2, \ldots, SP_m$ from the source spectral envelop of the mean $\mu_l^x$ of the source speaker, and spectral peaks denoted as $TP_1, TP_2, \ldots, TP_n$ from the target spectral envelop of the mean $\mu_l^y$ from the target speaker. The microprocessor 108 may align the spectral peaks of the target and source spectral envelopes to generate a lattice 300, where each node in the lattice 300 denotes one possible aligned formant pair.

In accordance with at least some exemplary embodiments, the microprocessor 108 calculates the possible aligned formant pairs using a constrained search to identify the nodes as described below. A node occurs in the lattice 300 where one or more source spectral peaks SP intersect with one or more target spectral peaks TP. For instance, FIG. 3 illustrates node 302 where source spectral peak $SP_1$ intersects with the target spectral peak $TP_1$, node 304 where source spectral peak $SP_2$ intersects with the target spectral peak $TP_1$, node 306 where source spectral peak $SP_3$ intersects with the target spectral peak $TP_2$, and node 308 where source spectral peak $SP_m$ intersects with the target spectral peak $TP_n$.

After the nodes are identified, the microprocessor 108 defines a cost for each node and a path cost for each path. A node cost is later described in further detail. The path cost is the cumulative node cost for all the nodes in the path. The best path is the one with minimum path cost, as seen in Equation (6).

$$path^* = \underset{path}{\operatorname{argmin}} \sum_{i \in path} \operatorname{cost}(i), \tag{6}$$

By finding the best path, the microprocessor 108 identifies the best (i.e., lowest cost) aligned formant pairs from the set of possible aligned formant pairs. Then, the microprocessor 108 calculates the mixture specific warping function for a particular mixture mean pair based on fitting a smooth curve through the aligned formant pairs along the best path in the lattice 300. The microprocessor 108 may then obtain the warping function based on a weighted combination of the mixture specific warping functions for each of the mixture mean pairs, as will be discussed below.

The node cost can be defined in different ways, for example, based on formant likelihood using peak parameters (e.g., shaping factor, peak bandwidth). In one implementation, the microprocessor 108 calculates the node cost as a distance to a baseline function 310 and assumes that the warping function has normally a minimal bias from the baseline function due to physiological limitations.

Deriving mixture specific warping functions in accordance with exemplary embodiments may provide advantages over conventional solutions. For instance, conventional warping functions are derived using heuristic and manual selection of the formants of the aligned segments which may hinder other applications where on demand derivation is desired.

Once the mixture specific warping functions are created, the training of the voice conversion GMM model is complete. The microprocessor 108 may then apply the voice conversion GMM model to convert additional sounds received from the source speaker to approximate the voice of the target speaker. Initially, in the voice conversion mode, the DSP 106 codes parameters of the additional sounds of the source speaker in a source feature vector as discussed above. Then, the microprocessor 108 applies a weighted combination of the mixture specific warping functions to the source feature vector as described below in FIG. 4 to convert the speech from the source speaker to resemble that of the target speaker.

Figure 4:
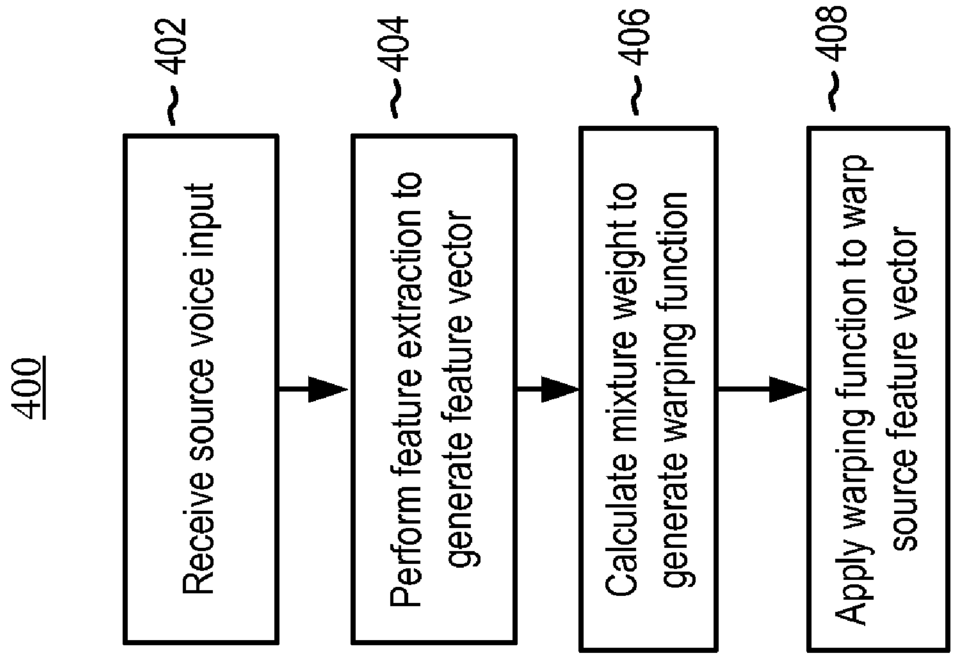
FIG. 4 illustrates a flow diagram of a method of applying a warping function to sounds of a source speaker to convert the sounds to approximate speech of a target speaker.

FIG. 4 illustrates a flow diagram of a method of applying a warping function to sounds of a source speaker to convert the sounds to approximate speech of a target speaker.

In block 402, the method 400 may include receiving a source voice input. The source speaker may speak into microphone 102, or the voice conversion device 100 may receive a recorded voice input, as discussed above.

In block 404, the method 400 may include performing feature extraction to generate a feature vector based on the source voice input. The DSP 106 may generate a feature vector based on the source input in the manner discussed above.

In block 406, the method 400 may include calculating a mixture weight (i.e., conditional probability) based on the source voice input to generate a warping function. In accordance with at least some exemplary embodiments, the microprocessor 108 can calculate the mixture weight, $p_l(x)$ from equation (5), above, using the input source feature vector x, and may derive the warping function W(ω) as a combination along the frequency of the weighting terms p and the mixture specific warping functions $W_l(\omega)$ based on equation (7) below.

$$W(\omega) = \sum_{l=1}^{L} p_l(x) \cdot W_l(\omega) \tag{7}$$

In block 408, the method 400 may include applying the warping function to warp the source feature vector. The warped source feature vector may approximate speech from the target speaker. The voice conversion device 100 may generate sound based on the warped source feature vector to approximate speech from the target speaker. Another exemplary embodiment of applying voice conversion is discussed below with reference to FIG. 5.

Figure 5:
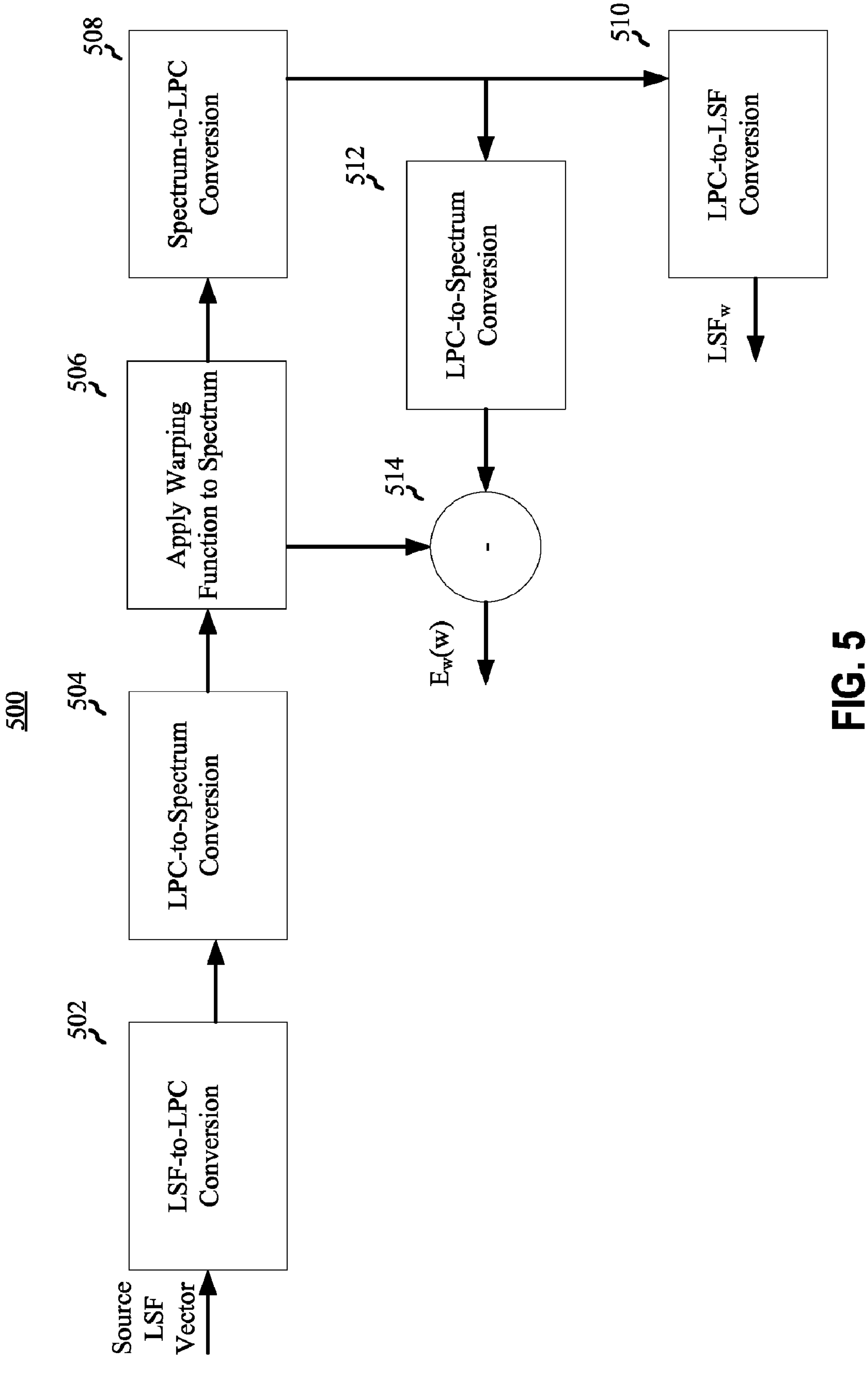
FIG. 5 illustrates a method of applying a voice conversion GMM model to a source LSF feature vector in accordance with exemplary embodiments.

FIG. 5 illustrates a method of applying a voice conversion GMM model to a source LSF feature vector in accordance with exemplary embodiments.

In block 502, the method 500 may include converting the LSF coefficients of the source feature vector into linear prediction coefficients (LPC). The microprocessor 108 may convert the LSF coefficients of the source feature vector into a linear prediction coefficient (LPC) vector.

In block 504, the method 500 may include obtaining a spectral envelope from the LPC vector. In accordance with at least some exemplary embodiments, the microprocessor 108 may obtain a spectral envelope S(ω) from the LPC vector.

In block 506, the method 500 may include applying the warping function to the spectral envelope. The microprocessor 108 may apply the warping function W(ω) to the spectral envelope S(ω) to obtain a warped spectrum $S(W^{-1}(\omega))$.

In block 508, the method 500 may include approximating a warped LPC vector from the warped spectrum. The microprocessor 108 may approximate the warped LPC vector from the warped spectrum $S(W^{-1}(\omega))$.

In block 510, the method 500 may include obtaining warped LSF coefficients from the warped LPC vector. The microprocessor 108 may obtain warped LSF coefficients from the warped LPC vector. The microprocessor 108 may output the warped LSF coefficients in a warped feature vector $LSF_W$ for storage or for output to the DAC 118. Additionally, the microprocessor 108 may estimate a warping residual.

In block 512, the method 500 may include obtaining a warped spectrum estimate from the warped LPC vector. The microprocessor 108 may obtain a warped spectrum estimate $S_E(W^{-1}(\omega))$ from the warped LPC vector.

In block 514, the method 500 may include subtracting the warped spectrum estimate from the warped spectrum. The microprocessor 108 may subtract the warped spectrum estimate $S_E(W^{-1}(\omega))$ obtained in block 512 from the warped spectrum $S(W^{-1}(\omega))$ obtained in block 506 to identify a residual warped spectrum $E_W(\omega)$. The output of the method 500 may be the residual warped spectrum $E_W(\omega)$ from block 514 and the warped feature vector $LSF_W$ from block 510, which together form the generalized excitation.

Broadly speaking from a speech production perspective, the speech S is generally modeled as a vocal tract transfer function H by LSF parameters and excitation E by amplitude parameters as further described with reference to FIG. 6, below.

Figure 6:
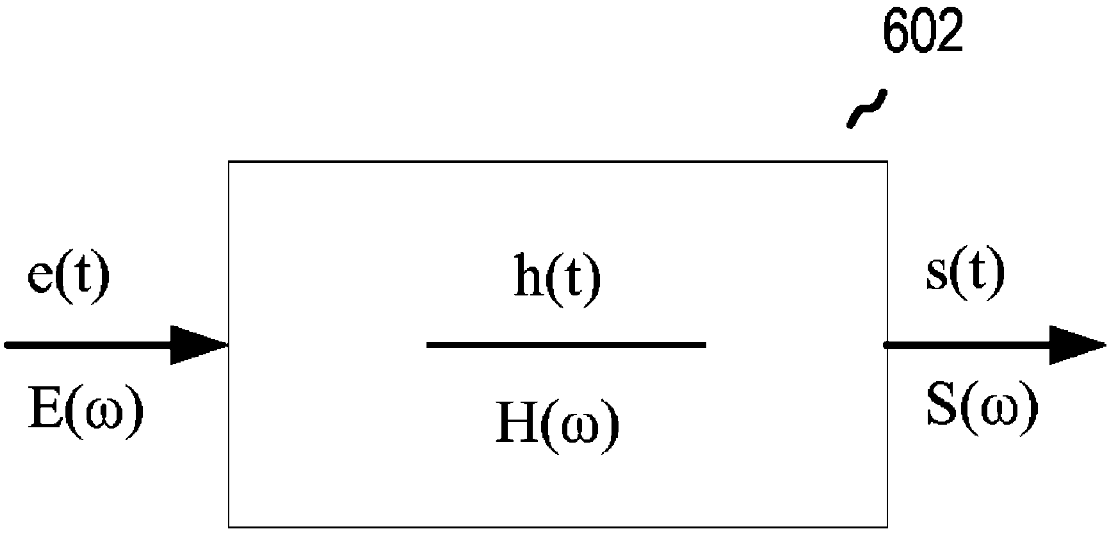
FIG. 6 is a speech production module in accordance with at least some exemplary embodiments.

FIG. 6 is a speech production module in accordance with exemplary embodiments. As depicted, the vocal transfer function H 602 receives excitation signal E, and outputs a converted voice signal S. FIG. 6 represents the vocal transfer function H in the time domain as h(t) and in the frequency domain as H(ω), the excitation E in the time domain as e(t) and in the frequency domain as E(ω), and the converted voice signal S in the time domain as s(t) and in the frequency domain as S(ω).

As seen in Equation (8) below, the source speech is modeled in the warped domain. The warped speech spectrum $S(W^{-1}(\omega))$ is the product of warped LPC spectrum $H_{LPC_W}(\omega)$ and generalized excitation spectrum $\hat{E}_W(\omega)$. The generalized excitation $\hat{E}_W(\omega)$ as shown in Equation (9) is composed of warped excitation, warping residual, and warped LPC spectrum $H_{LPC_W}(\omega)$. Weight, $1 \geqq \lambda \geqq 0$, is used to balance the contribution of the warping residual to the generalized excitation.

$$S(W^{-1}(\omega)) = H(W^{-1}(\omega)) \cdot E(W^{-1}(\omega)) = [H_{LPC_w}(\omega) + \alpha_w(\omega)] \cdot E_w(\omega) = H_{LPC_w}(\omega) \cdot \left[1 + \frac{\alpha_w(\omega)}{H_{lpc_w}(\omega)}\right] \cdot E_w(\omega) = H_{LPC_w}(\omega) \cdot \hat{E}_w(\omega) \tag{8}$$

$$\hat{E}_w(\omega) = \left[1 + \lambda \cdot \frac{\alpha_w(\omega)}{H_{lpc_w}(\omega)}\right] \cdot E_w(\omega) \tag{9}$$

As such, the source speech can be modeled in the warped domain to approximate speech from the target speaker.

The exemplary embodiments can provide numerous advantages. These include: (1) achieving good performance in terms of speaker identity and achieving excellent speech quality by benefiting from the advantages by using a hybrid of the GMM and frequency warping approaches; (2) efficiency by working directly on the coded speech in parametric domain; (3) automation by providing a fully data-driven approach; (4) flexibility; (5) compatibility by working with other existing speech coding solutions; (6) potential for use in speech synthesis (to modify TTS output); (7) achieves low computational complexity (especially when used together with a very low bit rate (VLBR) speech codec); (8) achieves a low memory footprint; and (9) is an ideal solution for embedded applications.

The methods and features recited herein may further be implemented through any number of computer readable media that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions and/or other data stored in a read only memory (ROM). In some such embodiments, ROM stores programming instructions that cause IC to perform operations according to one or more of the methods described herein. In at least some other embodiments, one or more the methods described herein are hardwired into IC. In other words, IC is in such cases an application specific integrated circuit (ASIC) having gates and other logic dedicated to the calculations and other operations described herein. In still other embodiments, IC may perform some operations based on execution of programming instructions read from ROM and/or RAM, with other operations hardwired into gates and other logic of IC. Further, IC may output image data to a display buffer.

Thus, the exemplary embodiments described herein provide a natural way to eliminate the drawbacks of each frequency warping and GMM modeling and to ensure both high speech quality and a good speaker identity conversion.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. A method comprising:

processing a set of source sounds to generate a source feature vector and processing a set of target sounds to generate a target feature vector;

aligning the source feature vector with the target feature vector to generate a joint variable;

estimating a probability density function for the joint variable, the probability density function including a mean vector; and training, by one or more processors, a mixture model based on the joint variable by a process that includes:

selecting a mixture mean pair from the mean vector, deriving a source spectral envelope and a target spectral envelope for the selected mixture mean pair, and generating a mixture specific warping function for the selected mixture mean pair based on the target and source spectral envelopes.

2. The method of claim 1, further comprising:

receiving a source sound;

applying linear prediction to the source sound to generate a second source feature vector;

calculating a mixture weight for the second source feature vector; and generating a warped feature vector by applying a function to the second source feature vector, the function including the mixture weight, the mixture specific warping function for the mixture mean pair, and other mixture specific warping functions for other mixture mean pairs selected from the mean vector.

3. The method of claim 1, wherein the set of source sounds is divided into a plurality of source segments and the set of target sounds is divided into a plurality of target segments, wherein aligning the source feature vector with the target feature vector comprises aligning source parameters derived from a first source segment with target parameters derived from a target segment of a corresponding acoustic event.

4. The method of claim 1, wherein generating the mixture specific warping function for the mixture mean pair includes:

identifying one or more first peaks from the source spectral envelope;

identifying one or more second peaks from the target spectral envelope;

identifying a set of nodes representing possible aligned formant pairings of the source spectral envelope with the target spectral envelope, each node of the set of nodes being located at an intersection between a peak from the one or more first peaks and a peak from the one or more second peaks.

5. The method of claim 4, wherein generating the mixture specific warping function for the mixture mean pair includes:

identifying one or more paths based on the set of nodes;

calculating a node cost for each node in the set of nodes;

for each of the one or more paths, calculating a path cost based on a sum of node costs that correspond to nodes along the path; and selecting a particular path from the one or more paths based on path costs of the one or more paths.

6. The method of claim 5, wherein generating the mixture specific warping function for the mixture mean pair includes applying curve fitting to the nodes along the particular path to derive the mixture specific warping function for the mixture mean pair.

7. The method of claim 1, wherein each of the source feature vector and the target feature vector comprise at least one of a line spectral frequency coefficient, energy information, amplitude information, pitch information, and voicing information.

8. The method of claim 1, wherein processing the set of source sounds and processing the set of target sounds generates a line spectral frequency representation of the set of source sounds and the set of target sounds.

9. The method of claim 1, wherein training the mixture model based on the joint variable includes generating a plurality of mixture specific warping functions, each warping function in the plurality of mixture specific warping functions corresponding to a specific mixture mean pair from the mean vector, and wherein one of the warping functions in the plurality of mixture specific warping functions is the mixture specific warping function for the mixture mean pair.

10. An apparatus comprising:

one or more processors; and one or more non-transitory computer readable media storing computer readable instructions configured to, with the one or more processors, cause the apparatus to at least:

process a set of source sounds to generate a source feature vector and process a set of target sounds to generate a target feature vector;

align the source feature vector with the target feature vector to generate a joint variable;

estimate a probability density function for the joint variable, the probability density function including a mean vector; and train a mixture model based on the joint variable by a process that includes:

selecting a mixture mean pair from the mean vector, deriving a source spectral envelope and a target spectral envelope for the selected mixture mean pair, and generating a mixture specific warping function for the selected mixture mean pair based on the target and source spectral envelopes.

11. The apparatus of claim 10, wherein the one or more computer readable media further store computer readable instructions configured to, with the one or more processors, cause the apparatus to:

receive a source sound;

apply linear prediction to the source sound to generate a second source feature vector;

calculate a mixture weight for the second source feature vector; and generate a warped feature vector by applying a function to the second source feature vector, the function including the mixture weight, the mixture specific warping function for the mixture mean pair, and other mixture specific warping functions for other mixture mean pairs selected from the mean vector.

12. The apparatus of claim 10, wherein the set of source sounds is divided into a plurality of source segments and the set of target sounds is divided into a plurality of target segment's, wherein aligning the source feature vector with the target feature vector comprises aligning source parameters derived from a first source segment with target parameters derived from a target segment of a corresponding acoustic event.

13. The apparatus of claim 10, wherein generating the mixture specific warping function for the mixture mean pair includes:

identifying one or more first peaks from the source spectral envelope;

identifying one or more second peaks from the target spectral envelope;

identifying a set of nodes representing possible aligned formant pairings of the source spectral envelope with the target spectral envelope, each node of the set of nodes being located at an intersection between a peak from the one or more first peaks and a peak from the one or more second peaks.

14. The apparatus of claim 13, wherein generating the mixture specific warping function for the mixture mean pair includes:

identifying one or more paths based on the set of nodes;

calculating a node cost for each node in the set of nodes;

for each of the one or more paths, calculating a path cost based on a sum of node costs that correspond to nodes along the path; and selecting a particular path from the one or more paths based on path costs of the one or more paths.

15. The apparatus of claim 14, wherein generating the mixture specific warping function for the mixture mean pair includes applying curve fitting to the nodes along the particular path to derive the mixture specific warping function for the mixture mean pair.

16. The apparatus of claim 10, wherein each of the source feature vector and the target feature vector comprise at least one of a line spectral frequency coefficient, energy information, amplitude information, pitch information, and voicing information.

17. The apparatus of claim 10, wherein processing the set of source sounds and processing the set of target sounds generates a line spectral frequency representation of the set of source sounds and the set of target sounds.

18. The apparatus of claim 10, wherein training the mixture model based on the joint variable includes generating a plurality of mixture specific warping functions, each warping function in the plurality of mixture specific warping functions corresponding to a specific mixture mean pair from the mean vector, and wherein one of the warping functions in the plurality of mixture specific warping functions is the mixture specific warping function for the mixture mean pair.

19. One or more non-transitory computer readable media storing computer readable instructions configured to, when executed, cause a processor to at least:

process a set of source sounds to generate a source feature vector and process a set of target sounds to generate a target feature vector;

align the source feature vector with the target feature vector to generate a joint variable;

estimate a probability density function for the joint variable, the probability density function including a mean vector; and train a mixture model based on the joint variable by a process that includes:

selecting a mixture mean pair from the mean vector, deriving a source spectral envelope and a target spectral envelope for the selected mixture mean pair, and generating a mixture specific warping function for the selected mixture mean pair based on the target and source spectral envelopes.

20. The one or more computer readable media of claim 19, further storing computer executable instructions configured to, when executed, cause the processor to:

receive a source sound;

apply linear prediction to the source sound to generate a second source feature vector;

calculate a mixture weight for the second source feature vector; and generate a warped feature vector by applying a function to the second source feature vector, the function including the mixture weight, the mixture specific warping function for the mixture mean pair, and the other mixture specific warping functions for other mixture mean pairs selected from the mean vector.

21. The one or more computer readable media of claim 19, wherein the set of source sounds is divided into a plurality of source segments and the set of target sounds is divided into a plurality of target segments, wherein aligning the source feature vector with the target feature vector comprises aligning source parameters derived from a first source segment with target parameters derived from a target segment of a corresponding acoustic event.

22. The one or more computer readable media of claim 19, wherein generating the mixture specific warping function for the mixture mean pair includes:

identifying one or more first peaks from the source spectral envelope;

identifying one or more second peaks from the target spectral envelope;

identifying a set of nodes representing possible aligned formant pairings of the source spectral envelope with the target spectral envelope, each node of the set of nodes being located at an intersection between a peak from the one or more first peaks and a peak from the one or more second peaks.

23. The one or more computer readable media of claim 22, wherein generating the mixture specific warping function for the mixture mean pair includes:

identifying one or more paths based on the set of nodes;

calculating a node cost for each node in the set of nodes;

for each of the one or more paths, calculating a path cost based on a sum of node costs that correspond to nodes along the path; and selecting a particular path from the one or more paths based on path costs of the one or more paths.

24. The one or more computer readable media of claim 23, wherein generating the mixture specific warping function for the mixture mean pair includes applying curve fitting to the nodes along the particular path to derive the mixture specific warping function for the mixture mean pair.

25. The one or more computer readable media of claim 19, wherein each of the source feature vector and the target feature vector comprise at least one of a line spectral frequency coefficient, energy information, amplitude information, pitch information, and voicing information.

26. The one or more computer readable media of claim 19, wherein processing the set of source sounds and processing the set of target sounds generates a line spectral frequency representation of the set of source sounds and the set of target sounds.

27. The one or more computer readable media of claim 19, wherein training the mixture model based on the joint variable includes generating a plurality of mixture specific warping functions, each warping function in the plurality of mixture specific warping functions corresponding to a specific mixture mean pair from the mean vector, and wherein one of the warping functions in the plurality of mixture specific warping functions is the mixture specific warping function for the mixture mean pair.

28. A method comprising:

receiving a sound;

applying linear prediction to the sound to generate a feature vector;

providing a plurality of mixture specific warping functions, each warping function in the plurality of mixture specific warping functions being specific to one mixture mean pair from a mean vector of a probability density function and being generated based on target and source spectral envelopes derived from the specific mixture mean pair, wherein the probability density function is for a source speaker and a target speaker;

calculating a mixture weight for the feature vector; and generating, by one or more processors, a warped feature vector by applying a function to the feature vector, the function including the mixture weight and the plurality of mixture specific functions, wherein a second sound generated based on the warped feature vector approximates a target sound from the target speaker.

29. The method of claim 28, wherein the method further comprises:

creating a linear prediction coefficient vector based on the feature vector; and calculating a spectral envelope of the linear prediction coefficient vector.

30. The method of claim 29, wherein the warping function is applied to the spectral envelope to generate a warped spectral envelope.

31. The method of claim 30, further comprising:

deriving a warped linear prediction coefficient vector from the warped spectral envelope;

converting the warped linear prediction coefficient vector to the warped feature vector; and generating sound based on the warped feature vector.

32. The method of claim 31, further comprising:

generating a warped spectral envelope estimate based on the warped linear prediction coefficient vector; and calculating a residual spectrum based on a difference between the warped spectral envelope and the warped spectral envelope estimate.

33. An apparatus comprising:

one or more processors; and one or more non-transitory computer readable media storing computer readable instructions configured to, with the one or more processors, cause the apparatus to at least:

receive a sound;

apply linear prediction to the sound to generate a feature vector;

provide a plurality of mixture specific warping functions, each warping function in the plurality of mixture specific warping functions being specific to one mixture mean pair from a mean vector of a probability density function and being generated based on target and source spectral envelopes derived from the specific mixture mean pair, wherein the probability density function is for a source speaker and a target speaker;

calculate a mixture weight for the feature vector; and generate a warped feature vector by applying a function to the feature vector, the function including the mixture weight and the plurality of mixture specific warping functions, wherein a second sound generated based on the warped feature vector approximates a target sound from the target speaker.

34. The apparatus of claim 33, wherein the one or more computer readable media further store computer readable instructions configured to, with the one or more processors, cause the apparatus to:

create a linear prediction coefficient vector based on the feature vector; and calculate a spectral envelope of the linear prediction coefficient vector.

35. The apparatus of claim 34, wherein the warping function is applied to the spectral envelope to generate a warped spectral envelope.

36. The apparatus of claim 35, wherein the one or more computer readable media further store computer readable instructions configured to, with the one or more processors, cause the apparatus to:

derive a warped linear prediction coefficient vector from the warped spectral envelope;

convert the warped linear prediction coefficient vector to the warped feature vector; and generate sound based on the warped feature vector.

37. The apparatus of claim 36, wherein the one or more computer readable media further store computer readable instructions configured to, with the one or more processors, cause the apparatus to:

generate a warped spectral envelope estimate based on the warped linear prediction coefficient vector; and calculate a residual spectrum based on a difference between the warped spectral envelope and the warped spectral envelope estimate.

38. One or more non-transitory computer readable media storing computer readable instructions configured to, when executed, cause a processor to at least:

receive a sound;

apply linear prediction to the sound to generate a feature vector;

provide a mixture model comprising a plurality of mixture specific warping functions, each warping function in the plurality of mixture specific warping functions being specific to one mixture mean pair from a mean vector of a probability density function and being generated based on target and source spectral envelopes derived from the specific mixture mean pair, wherein the probability density function is for a source speaker and a target speaker;

calculate a mixture weight for the feature vector; and generate a warped feature vector by applying a function to the feature vector, the function including the mixture weight and the plurality of mixture specific warping functions, wherein a second sound generated based on the warped feature vector approximates a target sound from the target speaker.

39. The one or more computer readable media of claim 38, further storing computer readable instructions configured to, when executed, cause the processor to:

create a linear prediction coefficient vector based on the feature vector; and calculate a spectral envelope of the linear prediction coefficient vector.

40. The one or more computer readable media of claim 39, wherein the warping function is applied to the spectral envelope to generate a warped spectral envelope.

41. The one or more computer readable media of claim 40, further storing computer readable instructions configured to, when executed, cause the processor to:

derive a warped linear prediction coefficient vector from the warped spectral envelope;

convert the warped linear prediction coefficient vector to the warped feature vector; and generate sound based on the warped feature vector.

42. The one or more computer readable media of claim 41, further storing computer readable instructions configured to, when executed, cause the processor to:

generate a warped spectral envelope estimate based on the warped linear prediction coefficient vector; and calculate a residual spectrum based on a difference between the warped spectral envelope and the warped spectral envelope estimate.

* * * * *